United States Patent [19]
Daniels

[11] Patent Number: 5,253,732
[45] Date of Patent: Oct. 19, 1993

[54] PORTABLE FOLDING TREE STAND

[76] Inventor: Danny R. Daniels, Rte. 3, Box 567, Broken Bow, Okla. 74728

[21] Appl. No.: 20,954

[22] Filed: Feb. 22, 1993

[51] Int. Cl.$^5$ .............................................. A45F 3/26
[52] U.S. Cl. ................... 182/116; 182/187; 182/100; 182/163; 182/20
[58] Field of Search ............... 182/116, 187, 188, 163, 182/20, 100

[56]  References Cited
U.S. PATENT DOCUMENTS

| | | | |
|---|---|---|---|
| 3,220,766 | 11/1965 | Kafes | 182/116 X |
| 4,061,202 | 12/1978 | Campbell | 182/187 X |
| 4,236,602 | 12/1980 | Leggett | 182/187 |
| 4,467,890 | 8/1984 | McCallam | 182/100 X |
| 4,552,246 | 11/1985 | Thomas | 182/116 |
| 4,552,247 | 11/1985 | Purdy | 182/116 |
| 4,592,446 | 6/1986 | White | 182/93 |
| 4,787,476 | 11/1988 | Lee | 182/116 |
| 5,195,611 | 3/1993 | Untz | 182/187 |

Primary Examiner—Alvin C. Chin-Shue
Attorney, Agent, or Firm—Robert K. Rhea

[57] ABSTRACT

A pole ladder folding deer stand is formed by upper and lower tubular sections hingedly joined in aligned relation and provided with vertically staggered steps for ascending and descending the pole ladder. A seat and backrest assembly hingedly connected with the upper limit of the upper pole section projects horizontally toward a tree and includes a yoke and strap assembly for joining the seat assembly to a tree. A foot platform is horizontally supported above the uppermost step forwardly of the position of the seat assembly. A ladder stabilizing engaging yoke projects laterally from the respective sides of the ladder lower section at its depending end. A bicycle fork journals a wheel attachable to one of the ladder sections to permit wheelbarrow-like movement of the folded ladder tree stand for transporting equipment or game.

5 Claims, 2 Drawing Sheets

PORTABLE FOLDING TREE STAND

BACKGROUND OF THE INVENTION

1. Field of the Invention

The present invention relates to big game hunting and more particularly to a combination tree stand and game carrier.

In the past, tree stands as commonly used in hunting, have generally been constructed on a tree and secured to the tree in a permanent fashion. These early stands were constructed mostly of wood and were functional and inexpensive to build. However, the construction of such tree stands was a time consuming project and since they were generally permanently attached to the tree, such tree stands were not easily moved and consequently did not lend themselves for use in hunting other areas.

The development of portable tree stands has resulted in a considerable increase in the use of tree stands by hunters for the reason they are marketed as a preassembled unit that may be temporarily secured to a tree and moved to other locations.

This invention provides such a portable tree stand which also may be used for carrying hunter's equipment and/or game when the hunt is ended.

2. Description of the Prior Art

U.S. Pat. No. 4,552,246, issued Nov. 12, 1985, to Thomas for Portable Hunter Tree Stand, discloses a seat and foot rest formed by tubular frame members including jaw and rope members for securing the seat to a tree in an elevated position. Access to and from the seat is obtained by an axially joined sectional pole ladder having a Y-shaped foot member at its depending end for stability.

U.S. Pat. No. 4,552,247, issued Nov. 12, 1985, to Purdy for Deer Stand, and U.S. Pat. No. 4,592,446, issued Jun. 3, 1986, to White for Portable Telescoping Tree Stand, are further examples showing the state-of-the-art.

The Purdy patent discloses a sectional ladder having a platform or seat arrangement at its uppermost end which is attached to a tree by flexible members to provide a support for a hunter.

The White patent discloses a telescoping ladder pole supporting a seat at its uppermost end in which the several sections of the telescoping pole are secured to the tree by flexible members.

This invention is believed distinctive over the above named patents by forming a portable deer stand which features light weight metallic tubular members hingedly joined in end to end relation with alternate steps on opposing sides thereof to form a pole ladder having a U-shaped ground engaging yoke at it's depending end and a seat attachable to a tree at its uppermost end and which further includes a wheel element for moving hunter equipment or game in a wheelbarrow-like fashion.

SUMMARY OF THE INVENTION

A pair of light weight metallic tubular sections are hingedly joined in end-to-end axial relation and provided with laterally projecting steps alternately spaced longitudinally of the respective sections.

The depending end portion of the lowermost section is provided with a U-shaped yoke for stability against lateral tilting movement of the ladder.

The top of the upper section is connected with laterally extending members forming a seat and seat back and including a yoke formed by diverging arms for partially surrounding the bowl of a tree when connected therewith by a flexible member. A fold-up foot platform is normally horizontally supported by the upper end of the top most section.

The tree stand assembly includes a bicycle-type wheel journalled by a wheel fork having a tubular end portion which is telescopically received by one end portion of the upper ladder section, when the ladder is in folded position, for mobility of the tree stand in which the ground engaging yoke serves as handles for balancing and guiding the folded tree stand assembly in wheelbarrow fashion.

The principal object of this invention is to provide a portable relatively light weight foldable tree stand for deer hunting, or the like, which features a fork journalling a wheel connectable with the tree stand when in a folded position for transporting articles placed thereon to and from the place of erecting the tree stand.

DESCRIPTION OF THE PREFERRED EMBODIMENTS

Figure 1:
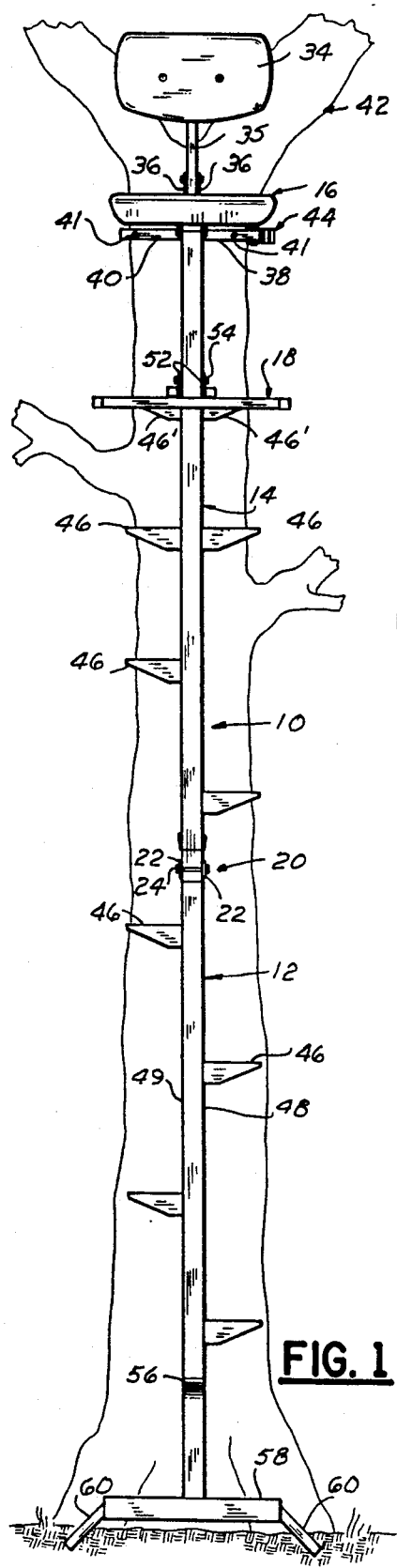
FIG. 1 is an elevational front view of the tree stand in erected position.

Like characters of reference designate like parts in those figures of the drawings in which they occur.

In the drawings:

The reference numeral 10 indicates the tree stand as a whole which is elongated pole ladder-type in general configuration.

The tree stand 10 comprises a base pole section 12 and an upper pole section 14 having a seat means 16 at its uppermost end and a foot platform 18 adjacent its upper end portion.

The tubular pole sections 12 and 14 are preferably square in transverse section having forward and rearward surfaces 13 and 15, respectively, and formed from light weight metallic material, such as aluminum, for relatively low mass of the device for reasons believed readily apparent.

The upper and base pole sections 12 and 14 are connected in longitudinally aligned relation by a clevis-type joint 20 in which the upper end of the base section 12 is hingedly connected, as at 22 (FIG. 3), to the forward surface of the depending end portion of the superposed upper section 14 with the lower end portion of the pole section 14 being bifurcated for receiving the upper end portion of the base pole section 12. A pin 24 rigidly joins the upper and base pole sections together in erected relation when erected.

The seat means 16 comprises a base pole member 26 which is similarly connected in clevis-type fashion to the upper end of the upper pole section 14 by a hinge means 28 pivotly connecting the base member 26 to the rearward face 15 of the upper end portion of the upper pole 14. The adjacent end portion of the seat base member 26 is bifurcated for receiving the upper end portion of the upper section 14 and joining the seat base 26 to the pole section 14 in right annular rearwardly projecting horizontal relation by a pin 30.

The seat means further includes a generally planar seat 32 overlying the seat base 26 and a seat back portion 34 which includes an upright pole-like standard 35 hingedly connected, as at 36, to the base member 26 by parallel lugs 37 secured to the member 26 in spaced relation rearwardly of the seat 32.

The rearward end portion of the seat base member 26 is provided with a yoke means comprising horizontally diverging arm members 38 and 40 forming a Y-shape for engaging the trunk of a tree 42 when the stand 10 is erected and positioned adjacent the tree. A flexible strap and buckle means 44 extends around the tree and anchors the seat arms to the tree. Each of the arms 38 and 48 are provided, intermediate their ends, with a sharpened prong 41 for partially penetrating the tree bark.

A plurality of steps 46, formed by relatively short lengths of the tubing material, are horizontally secured at one end to opposing sides 48 and 49 of the pole sections 12 and 14 in vertically spaced staggered relation for ascending and descending in ladder fashion.

The foot platform means 18 comprises a generally horizontal platform 50 slideably secured to the upper section 14 by a pair of parallel ears 52 secured to its rearward edge portion 53 and disposed on respective sides of the upper pole section 14 and interconnected rearwardly of the section 14 by a bolt or pin 54 having its axis disposed above the plane of the platform portion 50 when horizontally disposed, so that when the ears 52 are supported by a pair of opposing diametrically aligned steps 46' the platform is disposed horizontally forward of the upper pole section 14 in a position convenient for supporting the legs and feet of a hunter when sitting on the seat 32.

Figure 2:
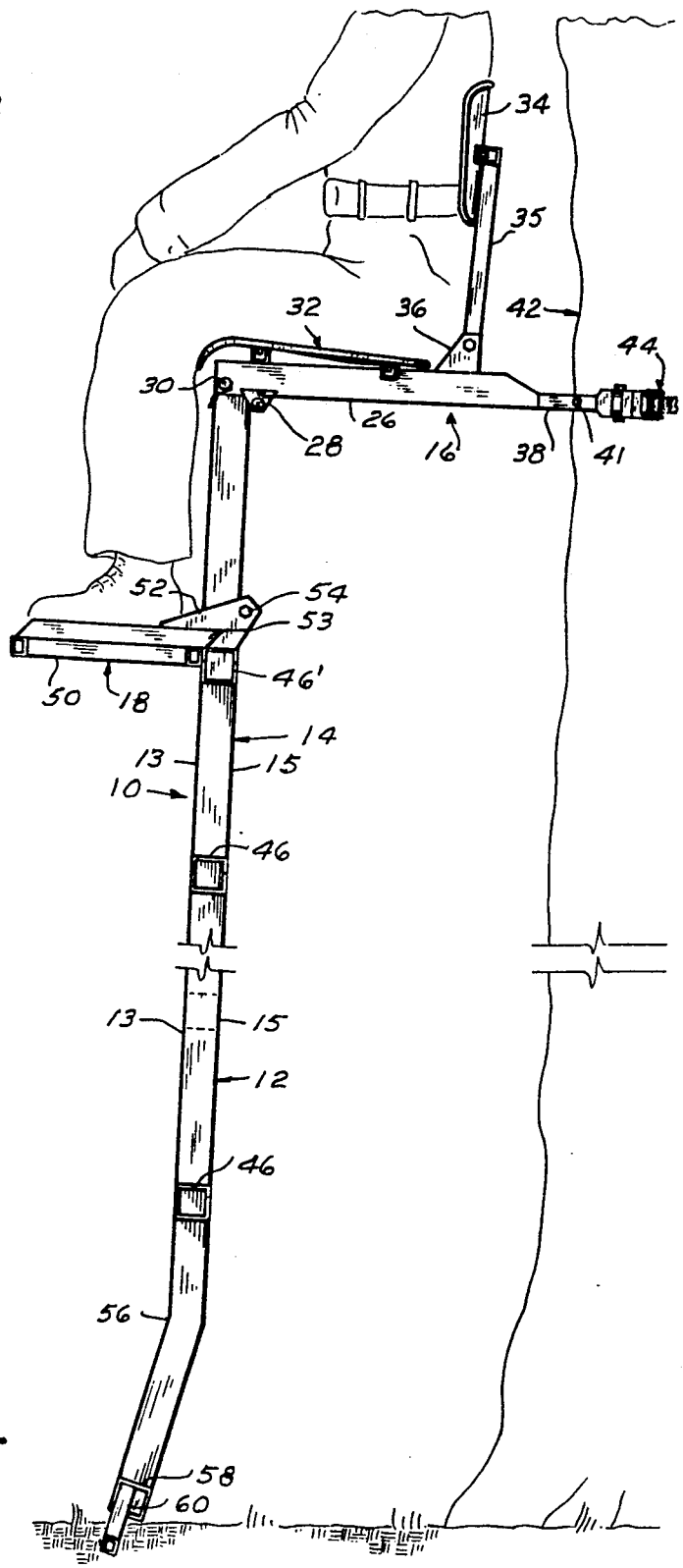
FIG. 2 is a fragmentary side view of the tree stand, illustrating the relative position of a hunter when seated thereon; and, FIG. 3 is a fragmentary side elevational view of the tree stand when in folded position and connected with its wheel for mobility.

The depending end portion of the base section 12 is angled forwardly in dogleg fashion, as at 56, to bias the mass of the device 10 toward the axis of the tree 42 when disposed in the operative positions of FIGS. 1 and 2.

The depending end of the base section 12 is further provided with a ground engaging yoke formed by a transverse yoke bar 58 and downwardly and laterally diverging smaller diameter tube sections 60, at its respective end, for forming earth anchors to laterally stabilize the device 10 when positioned adjacent a tree and supporting a hunter.

Figure 3:
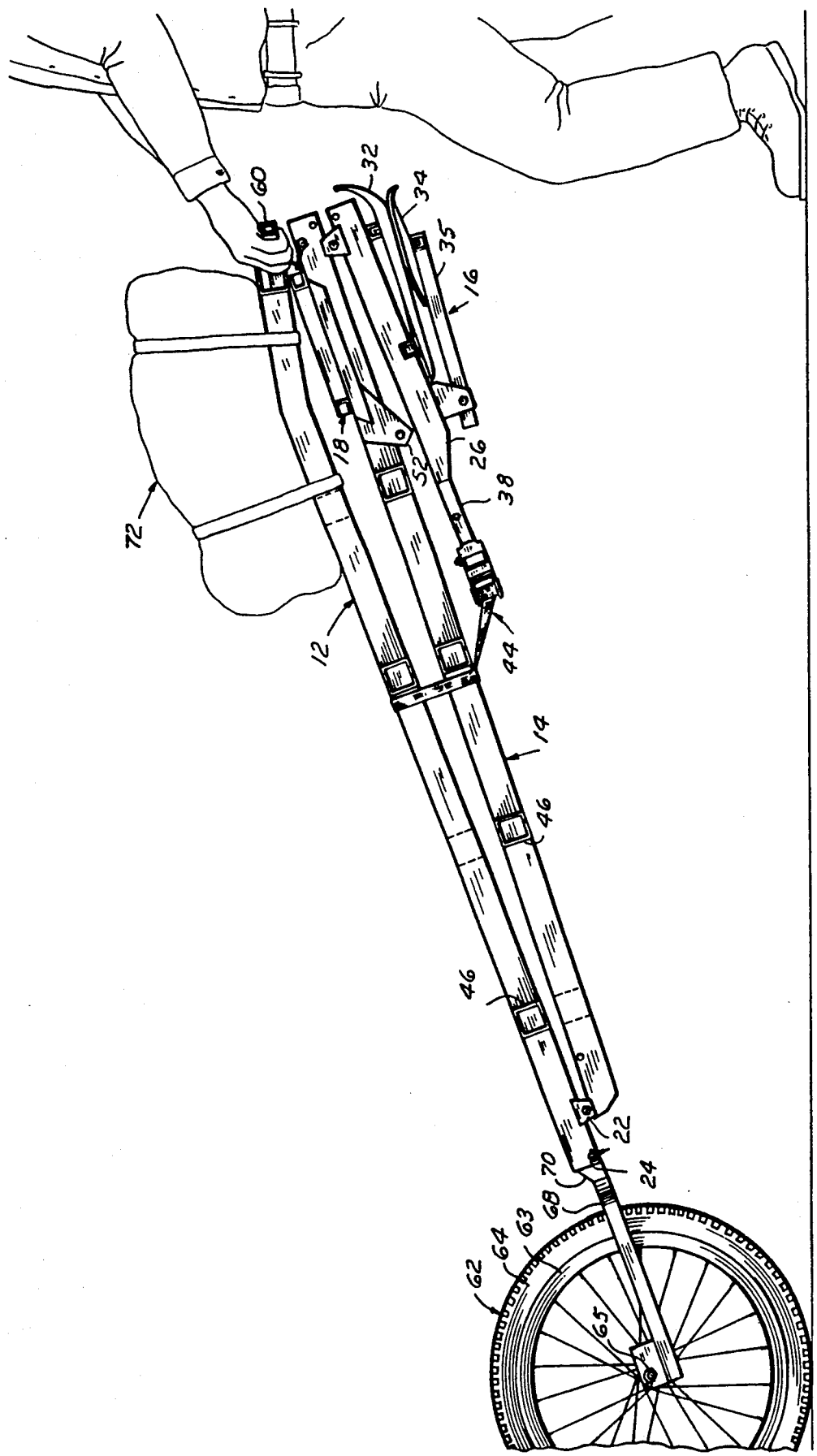

Referring more particularly to FIG. 3, the device further includes a bicycle-type wheel 62 comprising a wheel rim 63 having a pneumatic tire thereon and centrally supporting an axle 65 by a plurality of wire spokes 66 and having a bicycle-type fork 68 connected at one end with the wheel axle. The fork 6 is integral with a tubular end portion 70 which telescopically enters the depending end portion of the upper section 14 when the base section 12 is folded in juxtaposed underlying relation with respect to the upper section 14. The ground engaging tube sections 60 may then be grasped and serve as handles in wheelbarrow fashion for moving the tree stand as a unit to and from the hunting area and transporting supplies, as indicated at 72, or transporting game, not shown.

In its folded position, the foot platform means 18 overlaps and is folded back adjacent the upper end portion of the pole section 14. The seat means 16 is folded under the upper end portion of the folded base pole section 12 and the strap and buckle means 44 maintains the base pole section 12 and seat means 16 in a compact position adjacent the upper section 14.

Obviously the invention is susceptible to changes or alterations without defeating its practicability. Therefore, I do not wish to be confined to the preferred embodiment show in the drawings and described herein.

I claim:

1. A hunter's foldable and portable tree stand, comprising:
   a multisection pole-type ladder assembly including a base section and an upper section hingedly connected in axial rigid alignment when in upright operative position and juxtaposed when folded;
   a rigid generally planar seat overlying a pole-like seat base hingedly connected horizontally, at one end, with the upper end portion of said upper section for supporting a hunter above ground when in operative position and juxtaposed with said upper section when folded;
   yoke means including a pair of arms diverging from said seat base for contact with a tree;
   a foot support platform having a rearward portion and having a pair of rearwardly projecting ears secured to said rearward portion and straddling the upper end portion of said upper section for pivoting movement from a horizontal operative position to a juxtaposed position with the upper section when folded; and
   an elongated flexible element partially surrounding the tree opposite the yoke means and connected with said pair of arms for securing the seat to the tree.

2. The tree stand according to claim 1 in which the ladder assembly further includes:
   a plurality of tubular steps secured in horizontal outstanding diametric vertically staggered cooperative opposition on said base section and said upper section.

3. The tree stand according to claim 2 and further including:
   a ground engaging yoke secured to the depending end of said base section,
   said ground engaging yoke comprising a horizontally disposed yoke bar; and,
   earth anchor means including a pair of tubes secured, respectively, to the respective ends of said yoke bar in downward and laterally diverging relation.

4. The tree stand according to claim 3 and further including:
   a pair of lugs respectively secured to opposite sides, respectively, of said seat base rearwardly of said planar seat; and,
   seat back means including a pole-like standard pivotally mounted between said pair of lugs for pivoting movement between an upright back supporting operative position to a juxtaposed folded position adjacent said planar seat.

5. The tree stand according to claim 4 and further including:
   wheel means including a bicycle wheel fork secured to said base section for mobile movement of said tree stand when said pole ladder sections are in folded juxtaposed relation with said seat and said foot platform.

* * * * *